Nov. 3, 1953     B. M. SWEETSER     2,657,486
ROAD BARRIER GATE FOR PARKING LOTS
Filed May 16, 1949     2 Sheets-Sheet 1
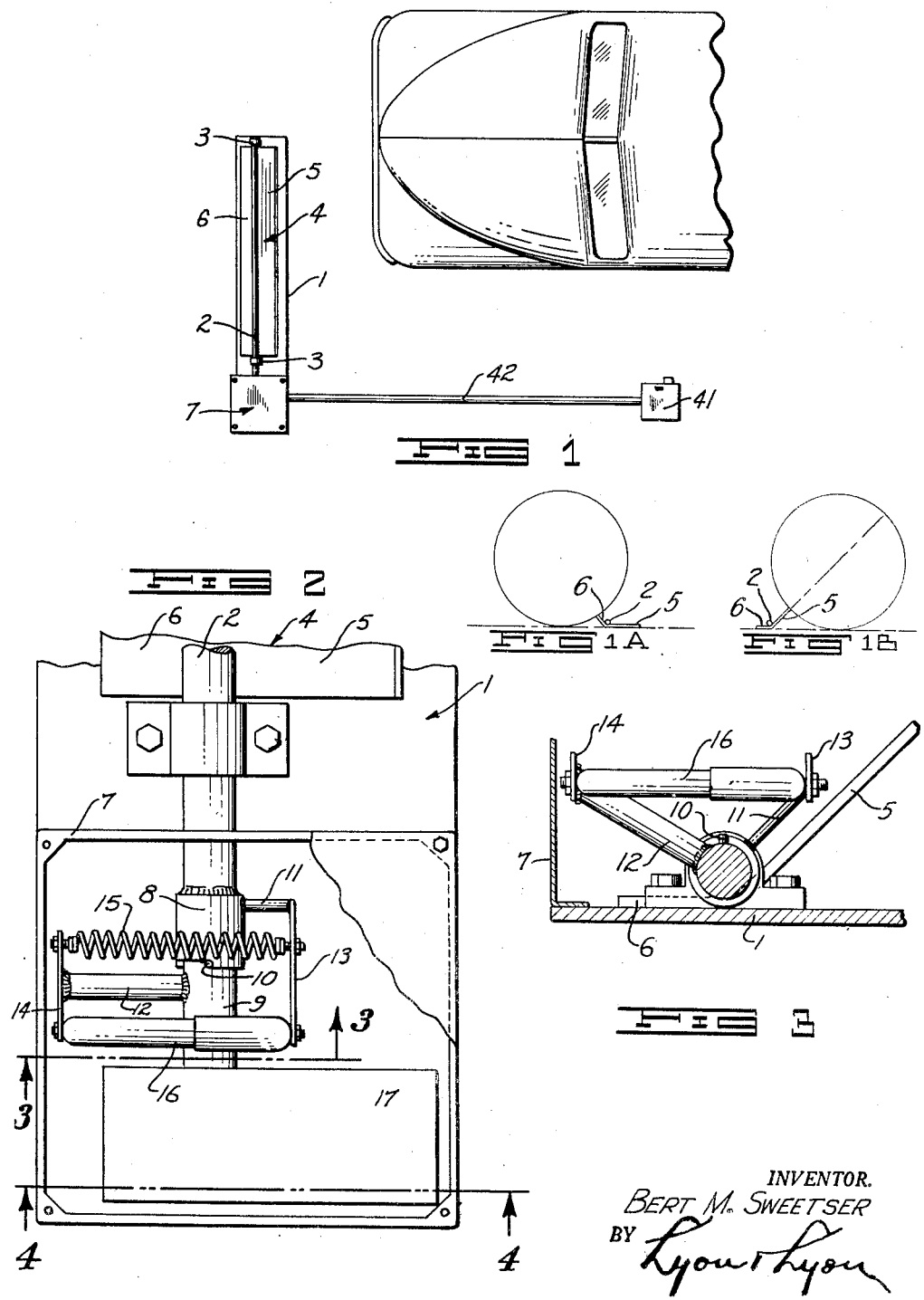
INVENTOR.
BERT M. SWEETSER
BY Lyon & Lyon
ATTORNEYS

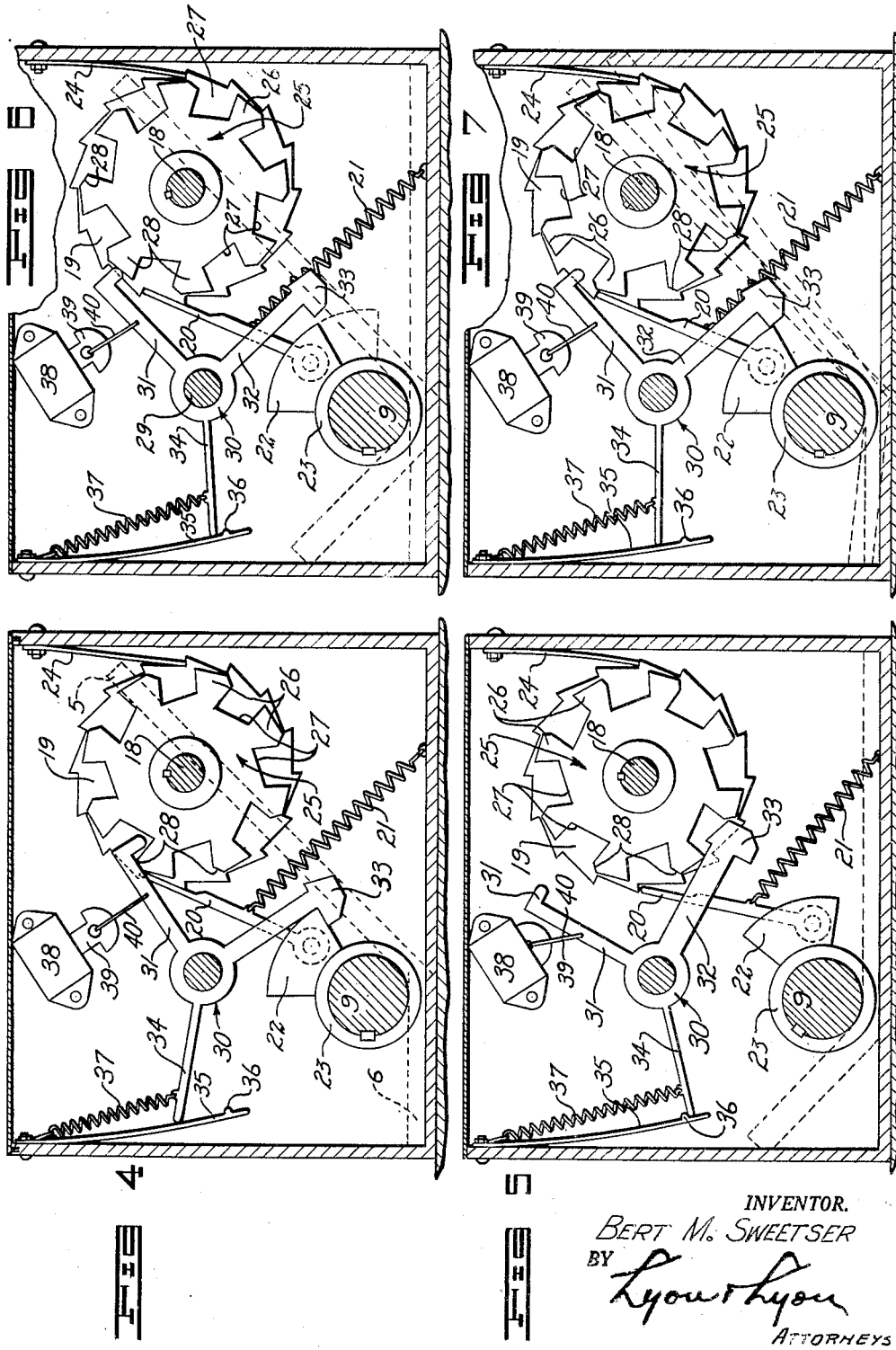

Patented Nov. 3, 1953

2,657,486

UNITED STATES PATENT OFFICE 2,657,486

ROAD BARRIER GATE FOR PARKING LOTS

Bert M. Sweetser, Trona, Calif., assignor of one-third to Morton Frishman, Los Angeles, Calif.

Application May 16, 1949, Serial No. 93,504

9 Claims. (Cl. 39—1)

1

My invention relates to gates for parking lots and included in the objects of my invention are:

First, to provide a gate for parking lots which is disposed entirely above ground level, eliminating all subsurface mechanism so that the parking gate may be readily installed or removed and enabling its use as either a permanent or temporary control for a parking lot.

Second, to provide a gate for parking lots which is particularly adapted for coin control and which is foolproof in operation, so as to permit self-service operation and eliminate the need of an attendant.

Third, to provide a gate for parking lots which may be employed as an entrance or exit gate, and so arranged that traffic may pass in one direction thereover but not in the opposite direction without operation of the control means.

Fourth, to provide in a parking gate, a novelly arranged tread structure over which a vehicle may drive without difficulty when the tread structure is released to permit passage, the tread structure being so controlled that both the front and rear wheels may pass before the tread is reset, or in the event a vehicle should reverse direction after one wheel has passed, return movement of the wheel resets the control mechanism.

With the above and other objects in view as may appear hereinafter, reference is made to the accompanying drawings, in which:

Fig. 1 is a substantially diagrammatical plan view of my parking lot gate with an automobile indicated as approaching the gate.

Figure 1A is a diagrammatical view showing the relation of a vehicle wheel and the gate as the vehicle approaches the tilting leaf of the gate.

Figure 1B is a similar diagrammatical view showing the relationship of a vehicle wheel and the gate as the vehicle approaches the barrier leaf of the gate.

Fig. 2 is an enlarged fragmentary plan view of the gate tread control means with the cover of the outer housing broken away.

Fig. 3 is a fragmentary sectional view through 3—3 of Fig. 2.

Figs. 4 to 7 inclusive, are similar sectional views taken through 4—4 of Fig. 2, showing the control mechanism in the series of positions it occupies in the course of admitting a vehicle past the gate.

My parking lot control gate is mounted on a base plate 1 which is suitably anchored in position to extend part way across an entrance to,

2 or an exit from, a parking lot. Mounted on the base plate, contiguous or closely adjacent thereto, is a shaft 2 supported near its extremities by bearings 3. Welded to the underside of the shaft 2 is a tread member 4 of obtusely V-shaped or angular cross-section forming a barrier leaf 5 and a tilting leaf 6. The barrier leaf 5 is of such width and proportion as to extend to an elevation high enough to prevent or discourage one from driving his vehicle over the barrier. As shown in Figure 1B, it is sufficient that the barrier leaf defines a plane passing through or close to the axis of the vehicle wheel when the wheel is abutting the edge thereof or closely adjacent. The tilting leaf 6 is narrower than the leaf 5, so that when raised, a vehicle may be readily driven over. The tread member is normally positioned so that the barrier leaf 5 is directed upwardly at an angle and the tilting leaf lies horizontally on the base plate 1.

At one end of the base plate 1 there is provided a housing 7 which contains the control mechanism for the tread member. The shaft 2 extends therein and is provided with a socket 8, which receives the end of a control shaft 9. A pin and slot means 10 connect the shafts 2 and 9 to permit limited relative movement. Arms 11 and 12 extend from the socket member 8 and the shaft 9. These arms are provided with tie bars at their extremities between which is connected a spring 15 and a snubber 16. The snubber may be an air or hydraulic dashport device. The spring 15 is relatively strong and exerts a force on the socket member 8 so as to urge the tread member toward its normal position wherein the barrier leaf 5 is elevated. With this arrangement, a vehicle may be driven from the left as viewed in Fig. 3, and force the barrier leaf 5 downward against the action of the spring 15, but cannot enter from the right.

The control shaft 9 extends within a control case 17 located within the housing 7, and is suitably journaled therein. Reference is now directed particularly to Figs. 4 through 7. The control case is provided with a cam shaft 18 disposed in parallelism with the control shaft 9. The cam shaft 18 carries a ratchet wheel 19, which is engaged by a pawl 20 yieldably held in contact with the teeth of the ratchet by a spring 21. The pawl 20 is pivotally mounted on a segmental latching boss 22 forming a part of a latching collar 23 secured to the shaft 9. Oscillation of the shaft 9 as brought out hereinafter, advances the ratchet 19. Detent 24 engages the ratchet 19 to prevent backward movement.

Also mounted on the shaft 18 is a cam wheel 25, the periphery of which is divided into a series of cam bosses 26 separated by recesses. The leading edge of each boss 26 is provided with bevelled face 28.

Supported in the control case above the shaft 9 and at one side of the shaft 18 is a control lever shaft 29 on which is pivoted a control lever 30 having a cam follower arm 31 terminating in a hook portion which enters the recesses 27 or rides upon the bosses 26. The control lever also includes a latch arm 32 having a latch head 33 positioned so as to engage the segmental latching boss 22. The backside of the latch arm and latch head, that is, the side facing the cam 25, is adapted to be engaged by the cam under certain conditions of operation, as will be brought out hereinafter.

The control lever is also provided with a retainer arm 34, the extremity of which rides against a latch element 35 in the form of a leaf spring having a lug 36 yieldably engaging the retainer arm, for purposes as will be brought out hereinafter. A spring 37 tends to move the control lever 30 in a clockwise direction as viewed in the drawings.

A solenoid 38 is provided with an armature 39 which is connected by a link 40 to the cam follower arm 31. The solenoid 38 is energized by a coin control switch means 41, mounted on a suitable pedestal for convenient operation of the driver of a vehicle approaching the parking lot gate. The coin control switch means is connected by a suitable conduit 42 to the housing 7 and control case 17.

Operation of my parking lot control gate is as follows:

Initially and normally the tread member is in the position shown in Figs. 1, 2, 3 and 4 with the tilting leaf flat and the barrier leaf inclined. As shown in Fig. 4, the latching boss is restrained by the latch arm 32 and latch head 33, and the barrier leaf is held inclined by the spring 15. The barrier leaf of the tread, however, may be depressed against the action of spring 15, by engagement from the left as viewed in Figure 1A and Figures 3 through 7. The barrier leaf is not depressed by a vehicle wheel attempting to enter from the right as shown particularly in Figure 1B, as the plane of the barrier leaf passes through or close to the axis of a wheel engaging the barrier leaf from this direction. It is of course recognized that one might wilfully drive a vehicle with sufficient force against the barrier leaf as to bounce the wheel up and over the barrier leaf, but in doing so it is quite likely that the vehicle or at least the tire might be severely damaged.

When a coin is deposited and the solenoid 38 energized, the latch head 33 is raised from the latch segment, as shown in Fig. 5, this permits the barrier leaf to drop by gravity to a horizontal position. This movement may be aided by spring 21, acting on lever 20 and its pivotal connection to the side of the boss 22. If, however, the vehicle tire should be bearing against the barrier leaf thus preventing movement of the barrier leaf, the control lever 30 is retained in a free position by the latch element 35 and lug 36, so that under such conditions the solenoid may be de-energized without causing the latch lever to reengage. Thus it is merely necessary for the vehicle to back sufficiently to free the barrier leaf and then proceed over the tread member.

Movement of the front wheels of the vehicle over the tread member, tilts the tread member to its original position, causing the pawl 20 to advance the ratchet wheel 19 and the cam wheel 25 to the position shown in Fig. 6. In this position, the cam follower arm 31 rests on a boss 26 and holds the latch lever free of the latching boss 22. Under these conditions the tread member is free to pivot until the barrier leaf is again flat and in position to permit the rear wheels or wheel of the vehicle to pass over.

It should be noted that in moving from the position shown in Fig. 5 to the position shown in Fig. 6, there is a slight camming action between a boss of the cam 25 and the backside of the latch arm 32, to move the retainer arm 34 past the lug 36.

As the rear wheels of the vehicle pass, the ratchet 19 and cam 25 is advanced again, this time the end of the cam follower arm 31 is free to drop into a recess 27, but does not do so until the latch head 33 rides past and engages an end of the latching boss 22, and thus reset the control device.

Having fully described my invention, it is to be understood that I do not wish to be limited to the details herein set forth, but my invention is of the full scope of the appended claims.

I claim:

1. A parking lot control gate, involving: a tread member including an obtusely angularly related, rigidly connected barrier leaf and tilting leaf; journal means adjacent the juncture of said leaves permitting oscillation of said tread member to dispose either of said leaves in an upwardly inclined position, the width of said barrier leaf being sufficiently large to restrain a vehicle wheel engaging its upwardly inclined edge, said tilting leaf being narrower in width than said barrier leaf to permit passage of a vehicle's wheel thereover in either direction; and yieldable means tending to maintain said barrier leaf elevated to permit traffic in one direction only across said tread member.

2. A parking lot control gate, involving: a tread member including an obtusely angularly related, rigidly connected barrier leaf and tilting leaf; journal means adjacent the juncture of said leaves permitting oscillation of said tread member to dispose either of said leaves in an upwardly inclined position, said barrier leaf being wider than said tilting leaf and when tilted being of such height as to restrain a vehicle wheel engaging its included elevated edge, said tilting leaf being sufficiently narrower than said barrier leaf to permit passage of a vehicle wheel thereover in either direction; latch means normally retaining said tread member in a position with said barrier leaf raised; a coin operated device for releasing said latch and causing said carrier leaf to be depressed to permit passage of a vehicle; and means responsive to movement of said tread member as a vehicle passes thereover to reset said latch means.

3. A parking lot control gate, involving: a tread member in the form of an obtuse V, the legs of said V forming a barrier leaf and a tilting leaf; journal means, at the apex of said V, permitting oscillation of said tread member to dispose either of said leaves in an upwardly inclined position, the width of said barrier leaf being such that, when inclined, its elevated edge is sufficiently high as to restrain a vehicle wheel moving toward the apex of said V, said tilting leaf being narrower than said barrier leaf so as to permit passage of a vehicle wheel thereover in either direction; latch means normally retaining said tread member with said barrier leaf raised, a coin operated device for releasing said latch and causing said barrier leaf to be depressed to permit passage of a vehicle, and means responsive to movement of said tread member as a vehicle passes over said tilting leaf to reset said latch means; and yieldable means interposed between said latch means and said tread member to permit depression of said barrier leaf by a vehicle moving over said tilting leaf and across said barrier leaf away from the apex of said V thereby to permit vehicle movement in one direction only except upon operation of said coin operated device.

4. A parking lot control gate, involving: a tread member including angularly related barrier leaf and tilting leaf defining an obtuse V; journal means at the apex of said V permitting oscillation of said tread member to dispose either of said leaves in an upwardly inclined position, the width of said barrier leaf being such that, when raised, its elevated edge restrains a vehicle wheel moving toward the apex of said V, said tilting leaf being narrower than said barrier leaf so as to permit passage of a vehicle wheel thereover in either direction; latch means normally disposing said tread member in a position with said barrier leaf raised; a remotely actuated device for releasing said latch to cause said barrier leaf to be depressed, thereby to permit passage of a vehicle thereover; and a resetting mechanism for said latch means, said resetting mechanism having alternate operative and inoperative positions thereby requiring double tilting of said tread member by passage of both the front and rear wheels of a vehicle before said latch means is reset.

5. A parking lot control gate, involving: a tread member including a rigidly connected relatively wide barrier leaf and a relatively narrow tilting leaf defining an obtuse V; journal means, at the apex of said V, permitting oscillation of said tread member to dispose either of said leaves in an upwardly inclined position, said barrier leaf being relatively wide, whereby, when raised, said barrier leaf occupies such height as to restrain a vehicle wheel moving toward the apex of said V, said tilting leaf being relatively narrow thereby to permit passage of a vehicle wheel thereover in either direction; latch means normally disposing said tread member in a position with said barrier leaf raised; a remotely actuated device for releasing said latch to cause said barrier leaf to be depressed, thereby to permit passage of a vehicle thereover; a resetting mechanism for said latch means, said resetting mechanism having alternate operative and inoperative positions thereby requiring double tilting of said tread member by passage of both the front and rear wheels of a vehicle before said latch means is reset; and yieldable means interposed between said latch means and said tread member to permit depression of said barrier leaf by a vehicle moving over said tilting leaf and across said barrier leaf away from the apex of said V thereby to permit vehicle movement in one direction only except upon operation of said remotely actuated device.

6. A vehicle control gate, involving: a base plate adapted to be placed at least partially across a vehicle driveway; a tread member oscillatably mounted thereon, said tread member including a pair of rigidly connected upwardly diverging leaves defining an obtuse V; one of said leaves being sufficiently wide that, when inclined and engaged by a vehicle wheel moving toward the apex of said V, said leaf forms a barrier against movement of the wheel thereover; latch means tending to dispose said barrier leaf in its vehicle restraining position, said barrier leaf being movable on release of said latch to a lower position permitting passage of a vehicle wheel thereover; a remotely operated device for releasing said latch to permit vehicle passage, the other of said leaves engageable by a vehicle wheel to oscillate said tread member; and means responsive to oscillation of said tread member incidental to passage of a vehicle wheel thereover to reset said latch.

7. A gate for controlling passage of vehicles, comprising: a relatively wide barrier plate, a relatively narrow tilting plate, said plates being rigidly connected to form an obtuse V in cross section; journal means in the region of the apex of said V whereby said barrier plate may be moved between a lower substantially horizontal position and an upper inclined position, said barrier plate being sufficiently large as to restrain, when elevated, a vehicle wheel moving in the direction of the apex of said V, said tilting plate being sufficiently narrow to permit movement of a vehicle wheel in either direction thereover and depressible by a vehicle wheel to effect tilting of said barrier plate to its inclined barring position; a latch for locking said barrier plate in said barring position; means for releasing said latch; and means for resetting said latch on depression of said tilting plate.

8. A gate for controlling passage of wheeled vehicles, comprising: a tread member including a relatively wide barrier tread and a relatively narrow tilting tread, joined along one margin to form an obtuse V; journal means in the region of the apex of said V to permit tilting of said tread member thereby to move said barrier tread between a raised wheel barring position and a lower inoperative position, said barrier tread normally occupying said lower inoperative position; latch means for retaining said barrier tread in its raised barring position; means for releasing said latch means; said tilting tread being depressible by a vehicle wheel passing over said barrier tread and past said journal means to raise said barrier plate to its barring position and engagement by said latch.

9. A gate for controlling passage of wheeled vehicles as set forth in claim 8 wherein: means operable by depression of said tilting tread for restraining said latch means until said tilting tread has been twice depressed thereby to permit passage of both front and rear wheels of a vehicle before said latch means retains said barrier plate in its barring position.

BERT M. SWEETSER.

References Cited in the file of this patent

UNITED STATES PATENTS

| Number | Name | Date |
|---|---|---|
| 1,426,062 | Harrington | Aug. 15, 1922 |
| 1,619,070 | Golding | Mar. 1, 1927 |
| 1,660,559 | Hodgkinson | Feb. 28, 1928 |
| 1,726,724 | Warren | Sept. 3, 1929 |
| 1,791,997 | Benton | Feb. 10, 1931 |
| 1,878,234 | Goodman | Sept. 20, 1932 |
| 2,015,607 | Shinn | Sept. 24, 1935 |
| 2,073,834 | Duany et al | Mar. 16, 1937 |
| 2,312,340 | Kilpatrick | Mar. 2, 1943 |
| 2,358,747 | Teetor | Sept. 19, 1944 |
| 2,528,790 | Scherer | Nov. 7, 1950 |